United States Patent Office 3,365,453
Patented Jan. 23, 1968

3,365,453
1-PHENYL-4-LOWER-ALKYL-2-PIPERAZINONES
Sydney Archer, Bethlehem, N.Y., assignor to Sterling Drug Inc., New York, N.Y., a corporation of Delaware
No Drawing. Filed Oct. 28, 1963, Ser. No. 319,574
9 Claims. (Cl. 260—268)

This invention relates to certain 1-(phenyl or substituted-phenyl)-4-lower-alkyl-2-piperazinones, their acid-addition salts, and to processes for the preparation thereof.

The compounds of the invention are represented by the general formula:

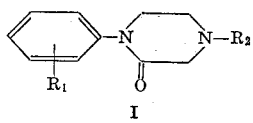

I wherein $R_1$ represents hydrogen or from one to three members of the group consisting of lower-alkyl, lower-alkoxy, and halogen; and $R_2$ represents lower-alkyl.

When $R_1$ represents more than one of the said lower-alkyl, lower-alkoxy, or halogen radicals, they can be the same or different and can occupy any of the available positions on the phenyl ring. For example, the invention includes compounds of the formula:

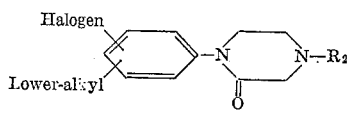

When $R_1$ or $R_2$ represents lower-alkyl, or when $R_1$ represents lower-alkoxy, the said lower-alkyl radical or the lower-alkyl portion of the said lower-alkoxy radical can, in either case, be straight or branched and can contain from one to about ten carbon atoms. Thus $R_1$ and $R_2$ each stands, inter alia, for methyl, ethyl, propyl, isopropyl, n-butyl, n-hexyl, n-octyl, n-decyl and the like, and $R_1$ in addition also stands, interalia, for methoxy, ethoxy, isopropoxy, n-butoxy, n-hexoxy, n-octoxy, n-decoxy, and the like.

When $R_1$ represents halogen, it can be any of the four halogens, fluorine, chlorine, bromine, or iodine.

The compounds of Formula I are prepared by: reacting an N-benzyl-N-lower-alkyl-N'-phenyl- (or substituted-phenyl)ethylenediamine (of Formula II below) with an α-halo-acetyl halide to give an N-benzyl-N-lower-alkyl-N'-phenyl- (or substituted-phenyl)-N'-(α-halo-acetyl)ethylenediamine (Formula III below); quaternizing the latter intermolecularly to give a 1-phenyl- (or substituted-phenyl)-4-lower-alkyl-2-piperazinone benzohalide quaternary salt (Formula IV below); and reducing this quaternary salt with hydrogen in the presence of a catalyst to effect hydrogenolysis of the N-benzyl group. The method is illustrated by the following sequence of reactions where $R_1$ and $R_2$ have the meanings given above, and X represents halogen.

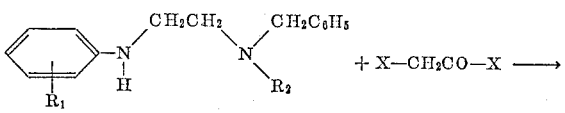

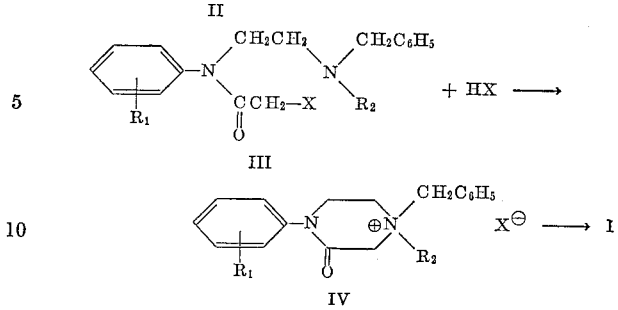

The reaction of the N-benzyl-N-lower-alkyl-N'-phenyl- (or substituted-phenyl)ethylenediamine of Formula II with the α-halo-acetyl halide is preferably carried out at a temperature in the range from about —5° C. to about 50° C. in an organic solvent inert under the conditions of the reaction, for example chloroform, methylene dichloride, ethylene dichloride, benzene, toluene, and the like.

The resulting N-benzyl-N-lower-alkyl-N'-phenyl-(or substituted - phenyl) - N' - (α - halo - acetyl)ethylenediamine of Formula III can be isolated and purified before further use or quaternized directly to the benzohalide quaternary salt of Formula IV. The latter reaction is carried out either in an organic solvent inert under the conditions of the reaction, for example, methanol, ethanol, acetonitrile, and the like, at the reflux temperature thereof, or by heating the amide alone on a steam bath.

The reduction of the benzohalide quaternary salt of Formula IV is carried out in an organic solvent inert under the conditions of the reaction, for example methanol, ethanol, isopropanol, and the like, at a temperature in the range from 20° C. to about 75° C. and at hydrogen pressures in the range from 30 to 100 pounds p.s.i. The reduction is carried out in the presence of catalysts generally known to effect debenzylation, for example palladium-on-charcoal or platinum.

An alternative method for preparing the compounds of Formula I comprises reacting a 1-phenyl- (or substituted-phenyl)-2-piperazinone with a lower-alkyl halide. The reaction is represented by the following equation where $R_1$ and $R_2$ have the meanings given above, and X represents halogen.

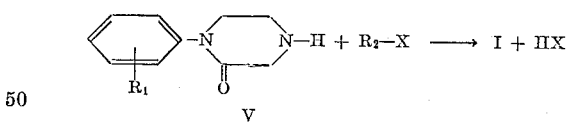

The reaction is preferably carried out at a temperature between about 50° C. to about 150° C. in the presence of an acid-acceptor and in an organic solvent inert under the conditions of the reaction, for example ethanol, methanol, 2-ethoxyethanol, benzene, xylene, and the like. The purpose of the acid-acceptor is to take up the hydrogen halide which is split out during the course of the reaction. It is a basic substance which preferably forms water-soluble by-products easily separable from the main product of the reaction and includes such substances as alkali metal salts of weak acids, e.g. sodium carbonate, sodium bicarbonate, potassium carbonate, sodium acetate, sodium alkoxides, and the like. The acid-acceptor can also be in the form of an excess quantity of the 1-phenyl- (or substituted-phenyl)-2-piperazinone.

The compounds of Formula I where $R_2$ is methyl can also be prepared by heating under reflux a mixture of the 1-phenyl- (or substituted-phenyl)-2-piperazinones of Formula V and formaldehyde in excess formic acid. The reaction is represented by the equation:

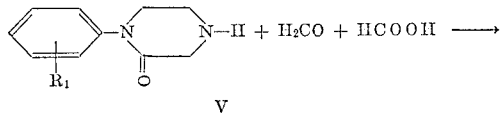

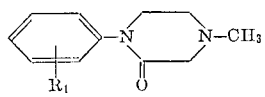

The novel compounds of the instant invention can exist and be used either in the free base form or the acid-addition salt form, and thus the acid-addition salts are considered to be the full equivalents of the corresponding free base. The compounds of the invention, in the free base form, are converted to the acid-addition salt form by interaction of the base with an acid. In like manner, the free base can be regenerated from the acid-addition salt form in the conventional manner, that is, by treating the salt with a strong aqueous base, for example an alkali metal hydroxide, alkali metal carbonate or alkali metal bicarbonate. The base thus regenerated can then be interacted with the same or a different acid. Thus the novel bases and all of their acid-addition salts are readily interconvertible.

It will thus be appreciated that Formula I not only represents the structural configuration of the bases of my invention but is also representative of the respective structural entity which is common to all of my respective compounds, whether in the form of the free bases or in the form of the acid-addition salts of the bases. I have found that by virtue of this common structural entity, the bases and their acid-addition salts have inherent pharmacodynamic and chemotherapeutic activities of a type to be more fully described hereinbelow. These inherent pharmacodynamic and chemotherapeutic activities can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing the pharmacodynamic and chemotherapeutic activities of the salts of the invention, I prefer of course to use pharmaceutically-acceptable salts. Although water insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivaties can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition and quaternary ammonium salts of my new bases are useful and valuable compounds, regardless of considerations of solubility, toxicity, physical form, and the like, and are accordingly within the purview of the instant invention.

The novel feature of the compounds of the invention, then resides in the concept of the bases and cationic forms of the new 1 - phenyl- (or substituted-phenyl)-4-lower-alkyl-2-piperazinones and not in any particular acid anion associated with the salt form of my compounds; rather, the acid anion which can be associated in the salt form are in themselves neither novel nor critical and therefore can be any acid anion or acid-like substance capable of salt formation with bases. In fact in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid, organic mono- and polysulfonic and -sulfinic acids, organic phosphonic and phosphinic acids, organic acids of arsenic and antimony, organic heterocyclic carboxylic, sulfonic, and sulfinic acids, acidic ion-exchange resins, and inorganic acids of any acid forming element or combination of elements. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds and acidic compounds having "activated" or acidic hydrogen atoms, as for example, picrolonic acid, or barbituric acid derivatives having an acidic proton. Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4 - methoxybenzoic acid, phthalic acid, anthranilic acid, 1 - naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2 - pyridinecarboxylic acid, 3 - indoleacetic acid, quinic acid, sulfamic acid, methanesulfonic acid, isethionic acid, benzenesulfonic acid, p-toluenesulfonic acid, p-aminophenylarsinic acid, phenylstibnic acid, phenylphosphinous acid, methylphosphonic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The compounds of Formula I have been found to possess trichomonacidal and antifungal activities. They have also been found to possess sedative activity as shown by the potentiation of sleeping time in mice induced by ether, thiopental sodium or hexobarbital sodium. These activities indicate their usefulness as trichomonacidal agents, antifungal agents, or sedatives.

Trichomonacidal activity data are given for representative compounds in Table 1 below where each of the compounds is identified by the number of the example which follows where its preparation is described. In each case the compounds were administered orally by stomach tube in hamsters, and the data are expressed in terms of the percentage of the animals cleared at the particular dose level.

TABLE 1

| Example: | Activity, percent cleared at 100 mg./kg. |
|---|---|
| 3 | 80 |
| 4 | 67 |
| 5 | 25 |
| 9 | 50 |
| 10 | 50 |
| 16 | 40 |
| 20 | 80 |

1 - phenyl - 4 - n-hexyl-2-piperazinone, prepared in Example 11, was found to be fungistatic and fungicidal at a dilution of 1:10 against *T. mentagrophytes* and was found to be fungistatic at a dilution of 1:10 against *M. albicans*.

The effective dose$_{50}$ (ED$_{50}$) of 1-(2,6-dimethylphenyl)-4-n-butyl-2-piperazinone, prepared in Example 4, in potentiating the sleeping time in mice induced by hexobarbital was found to be 55.0±16.7 mg./kg. on subcutaneous administration.

The compounds can be prepared for use by dissolving, under sterile conditions, a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration or in combination with suitable adjuvants such as calcium carbonate, starch, lactose, talc, magnesium stearate, gum acacia, and the like. Still further the compounds can be formulated for oral administration in aqueous alcohol, glycol, or oil solutions or oil-water emulsions in the same manner as conventional medicinal substances are prepared.

The chemical structures of the compounds of the invention are established by their mode of synthesis and are corroborated by the correspondence between calculated values for the elements and values found by chemical analysis.

The following examples will further illustrate specific embodiments of the invention without the latter being limited thereto.

EXAMPLE 1

*1-(2,6-dimethylphenyl)-4-ethyl-2-piperazinone hydrochloride [I: $R_1$ is 2,6-di-CH$_3$; $R_2$ is $C_2H_5$]*

To a solution of 11.3 g. (0.04 mole) of N-benzyl-N-ethyl-N'-(2,6-dimethylphenyl)ethylenediamine in 50 ml. of chloroform was added, in portions, 9 g. (0.08 mole) of α-chloroacetyl chloride. The mixture was heated under reflux for thirty minutes, taken to dryness in vacuo, and the residual gum dissolved in water and extracted with ether. The aqueous layer was then basified with excess sodium hydroxide, extracted with ether, and the ether extracts taken to dryness giving crude N-benzyl-N-ethyl-N' - (2,6-dimethylphenyl) - N' - (α-chloroacetyl)ethylenediamine as a light red oil.

The latter was heated on a steam bath for an hour and a half, washed once with anhydrous ether, and the residual material, 1-(2,6-dimethylphenyl) - 4-ethyl-2-piperazinone benzochloride, was dissolved in absolute ethanol.

To the solution was added 1 g. of 10% palladium-on-charcoal, and the mixture, in a Parr shaker, was subjected to hydrogenation. Reduction was completed in about four minutes. The mixture was filtered from the catalyst and the filtrate concentrated until crystallization began. The solid which separated was collected, after dilution of the mixture with ether, to give 6.2 g. of 1-(2,6-dimethylphenyl)-4-ethyl - 2 - piperazinone hydrochloride, M.P. 238.2–240.6° C. (corr.).

EXAMPLE 2

*1-(2,6-dimethylphenyl)-4-methyl-2-piperazinone hydrobromide [I: $R_1$ is 2,6-di-CH$_3$; $R_2$ is CH$_3$]*

To a solution of 38.1 g. (0.1 mole) of N,N-dibenzyl-N'-(2,6-dimethylphenyl)ethylenediamine in 150 ml. of chloroform was added, over a period of one minute, 22.5 g. (0.2 mole) of α-chloroacetyl chloride. The mixture was heated under reflux for six hours, cooled, diluted with ethyl ether, and the solid which separated was collected, dried, and recrystallized from acetone-ether to give 18.2 g. of N,N-dibenzyl-N'-(2,6-dimethylphenyl)-N'-(α-chloroacetyl)ethylenediamine hydrochloride, M.P. 148.2–150.4° C. (corr.).

The latter (116 g., 0.25 mole) was converted to the free base by suspending the hydrochloride salt in dilute sodium hydroxide, extracting with chloroform, and evaporating the solvent from the combined extracts. The resulting base was dissolved in 200 ml. of dimethylformamide and refluxed with slow distillation of the solvent for two and a quarter hours during which time 150 ml. of solvent was removed. The residue was treated with alcoholic hydrogen chloride and diluted with ether. Collection of the solid which separated and recrystallization from methanol afforded 54 g. of 1-(2,6-dimethylphenyl)-4-benzyl - 2 - piperazinone hydrochloride, M.P. 248.8–264.8° C. (corr.).

The latter (9.9 g., 0.03 mole) was converted to the free base by suspending the hydrochloride salt in dilute sodium hydroxide, extracting with chloroform, and evaporating the solvent from the combined extracts. The resulting free base was dissolved in 25 ml. of absolute ethanol, and methyl bromide was bubbled through the mixture for one hour. The reaction mixture was allowed to stand overnight and was then diluted with diethyl ether. The gummy solid which separated was recrystallized from ethanol-ether to give 1-(2,6-dimethylphenyl)-4-methyl-2-piperazinone benzobromide, M.P. 197–199° C. (uncorr.).

The latter (6.6 g., 0.017 mole), dissolved in 100 ml. of absolute ethanol, was reduced with hydrogen over 0.5 g. of 10% palladium-on-charcoal using the manipulative procedure described above in Example 1. The product was purified by recrystallization from ethanol to give 2.5 g. of 1-(2,6-dimethylphenyl)-4-methyl-2-piperazinone hydrobromide, M.P. 248.0–248.6° C. (corr.).

EXAMPLES 3–8

The compounds of Formula I listed below in Table 2 were prepared according to the procedure described above in Example 1 from an appropriate N-benzyl-N-lower-alkyl-N'-phenyl- (or substituted-phenyl)-ethylenediamine and α-chloroacetyl chloride. In every case the crude benzohalide quaternary ammonium salt was isolated in crude form and, without further purification, was subjected to hydrogenolysis. All melting points are corrected, and the notation "Crystd. from" indicates the recrystallization solvent.

TABLE 2

| Ex. | $R_1$ | $R_2$ | Salt | M.P./Crystd. from— |
|---|---|---|---|---|
| 3 | 2,6-di-$C_2H_5$ | $C_2H_5$ | HCl | 254.0–261.2° C. ethanol-ether. |
| 4 | 2-cl-6-CH$_3$ | $C_2H_5$ | HCl | 231.0–238.0° C. ethanol. |
| 5 | 2,6-di-CH$_3$ | n-$C_4H_9$ | HCl | 264.6–276.6° C. ethanol. |
| 6 | H | $C_2H_5$ | HCl | 178.6–180.8° C. isopropanol-acetone. |
| 7 | 4-Cl | $C_2H_5$ | HCl | 200.8–206.8° C. isopropanol. |
| 8 | 3-Cl-4-CH$_3$ | $C_2H_5$ | p-Tosylate | 194.4–198.6° C. ethanol. |

EXAMPLE 9

*1-(2,6-dimethylphenyl)-4-n-hexyl-2-piperazinone hydrochloride* [I: $R_1$ is 2,6-di-$CH_3$; $R_2$ is $CH_3(CH_2)_5$]

A mixture of 7.2 g. (0.03 mole) of 1-(2,6-dimethylphenyl)-2-piperazinone hydrochloride, 5.5 g. (0.03 mole) of n-hexyl bromide, and 8.3 g. (0.06 mole) of potassium carbonate in 35 ml. of 2-ethoxyethanol was heated under reflux for four hours, then cooled, and poured into water. The mixture was rendered strongly basic with potassium carbonate, extracted with ether, and the ether extracts dried and taken to dryness. The residual oil was converted to the hydrochloride salt by dissolving the former in ethanolic hydrogen chloride and recrystallizing the crude product from isopropanol thus giving 3.0 g. of 1-(2,6-dimethylphenyl)-4-n-hexyl-2-piperazinone hydrochloride, M.P. 225.0–230.2° C. (corr.).

EXAMPLES 10–19

The compounds of Formula I listed below in Table 3 were prepared according to the procedure described above in Example 9 from an appropriate 1-phenyl- (or substituted-phenyl)-2-piperazinone and an appropriate lower-alkyl halide. All melting points are corrected.

TABLE 3

| Ex. | $R_1$ | $R_2$ | Salt | M.P./Crystd. from— |
|---|---|---|---|---|
| 10 | H | n-$C_4H_9$ | HCl | 194.2–195.8° C. ethanol. |
| 11 | H | n-$C_6H_{13}$ | HCl | 167.2–171.2° C. isopropanol. |
| 12 | 3-Cl-4-$CH_3$ | n-$C_4H_9$ | HCl | 224.8–229.0° C. ethanol. |
| 13 | 3-Cl-4-$CH_3$ | n-$C_6H_{13}$ | HCl | 164.8° C. (indef.). ethanol. |
| 14 | H | n-$C_8H_{17}$ | HCl | 185.4–201.4° C. isopropanol. |
| 15 | 3-Cl-4-$CH_3$ | n-$C_8H_{17}$ | HCl | 181.0–235° C. ethanol. |
| 16 | H | $CH(CH_3)_2$ | HCl | 196.2–197.4° C. ethanol. |
| 17 | 2,6-di-$CH_3$ | n-$C_8H_{17}$ | HCl | 200.0–201.4° C. isopropanol. |
| 18 | 2,6-di-$C_2H_5$ | n-$C_4H_9$ | HCl | 185.6–188.2° C. ethyl acetate. |
| 19 | 3-Cl-4-$CH_3$ | $CH(CH_3)_2$ | HCl | 193.0–213.0° C. ethanol. |

EXAMPLE 20

*1-(3-chloro-4-methylphenyl)-4-methyl-2-piperazinone p-toluenesulfonate* [I: $R_1$ is 3-Cl-4-$CH_3$; $R_2$ is $CH_3$]

A solution of 4.5 g. (0.02 mole) of 1-(3-chloro-4-methylphenyl)-2-piperazinone, 1.8 ml. of 40% aqueous formaldehyde, and 10 ml. of formic acid was heated under reflux for seventeen hours and then taken to dryness in vacuo. The residual oil was suspended in dilute aqueous sodium hydroxide, extracted with chloroform, and the chloroform extracts taken to dryness. The residue was dissolved in ethanol, treated with p-toluenesulfonic acid, and the solid which separated was collected and recrystallized from ethanol giving 3.3 g. of 1-(3-chloro-4-methylphenyl)-4-methyl-2-piperazinone p-toluenesulfonate, M.P. 182.4–185.6° C.

EXAMPLES 21–26

By following the manipulative procedure described above in Example 9, substituting for the 1-(2,6-dimethylphenyl)-2-piperazinone and the n-hexyl bromide used therein molar equivalent amounts of an appropriate 1-(substituted-phenyl)-2-piperazinone and an appropriate lower-alkyl halide, there can be obtained the compounds of Formula I listed below in Table 4.

TABLE 4

| Example | $R_1$ | $R_2$ |
|---|---|---|
| 21 | 4-Br-2-$CH_3$ | n-$C_4H_9$ |
| 22 | 4-F | n-$C_6H_{13}$ |
| 23 | 4-I | n-$C_8H_{17}$ |
| 24 | 3-$CH_3O$ | n-$C_{10}H_{21}$ |
| 25 | 3-$C_4H_9O$ | $CH_3$ |
| 26 | 4-n-$C_4H_9$ | $C_2H_5$ |

I claim:
1. A compound of the formula

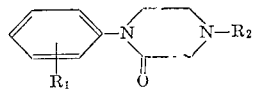

wherein $R_1$ is a member of the group consisting of hydrogen and from one to three members of the group consisting of lower-alkyl, lower-alkoxy, and halogen; and $R_2$ is lower-alkyl.

2. A compound of the formula

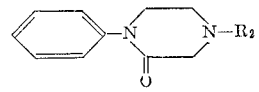

wherein $R_2$ is lower-alkyl.

3. A compound of the formula

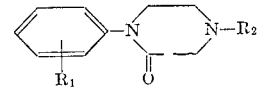

wherein $R_1$ is from one to three lower-alkyls and $R_2$ is lower-alkyl.

4. A compound of the formula

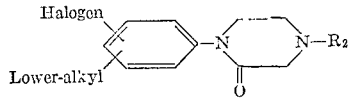

where $R_2$ is lower-alkyl.

5. A compound of the formula

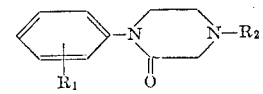

where $R_1$ is halogen and $R_2$ is lower-alkyl.

6. 1-(2-chloro-6-methylphenyl)-4-ethyl-2-piperazinone.
7. 1-(2,6-dimethylphenyl)-4-n-butyl-2-piperazinone.
8. 1-(2,6-dimethylphenyl)-4-n-hexyl-2-piperazinone.
9. 1-phenyl-4-ethyl-2-piperazinone.

References Cited

UNITED STATES PATENTS

| | | | |
|---|---|---|---|
| 2,636,032 | 4/1953 | Weston et al. | 260—268 |
| 3,062,821 | 11/1961 | Archer | 260—268 |
| 3,072,658 | 1/1963 | Fancher et al. | 260—268 |
| 2,653,153 | 9/1953 | De Benneville | 260—268 |
| 2,958,639 | 11/1960 | Phillips | 260—268 |

HENRY R. JILES, *Primary Examiner.*

N. S. RIZZO, IRVING MARCUS, *Examiners.*

J. W. ADAMS, N. H. STEPNO, *Assistant Examiners.*